Sept. 19, 1972   E. M. RISGAARD   3,692,608
SEALING MEANS AND METHOD
Filed Jan. 20, 1971   3 Sheets-Sheet 1
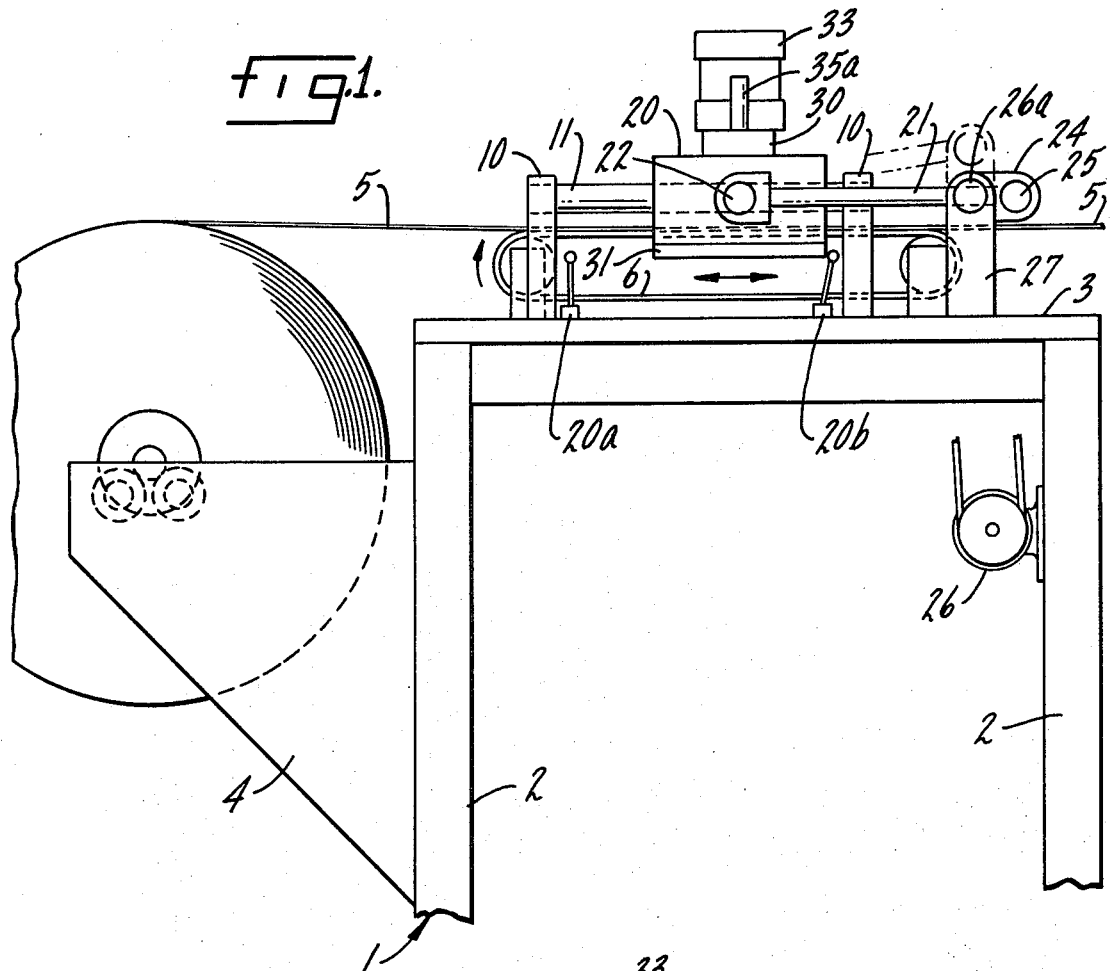
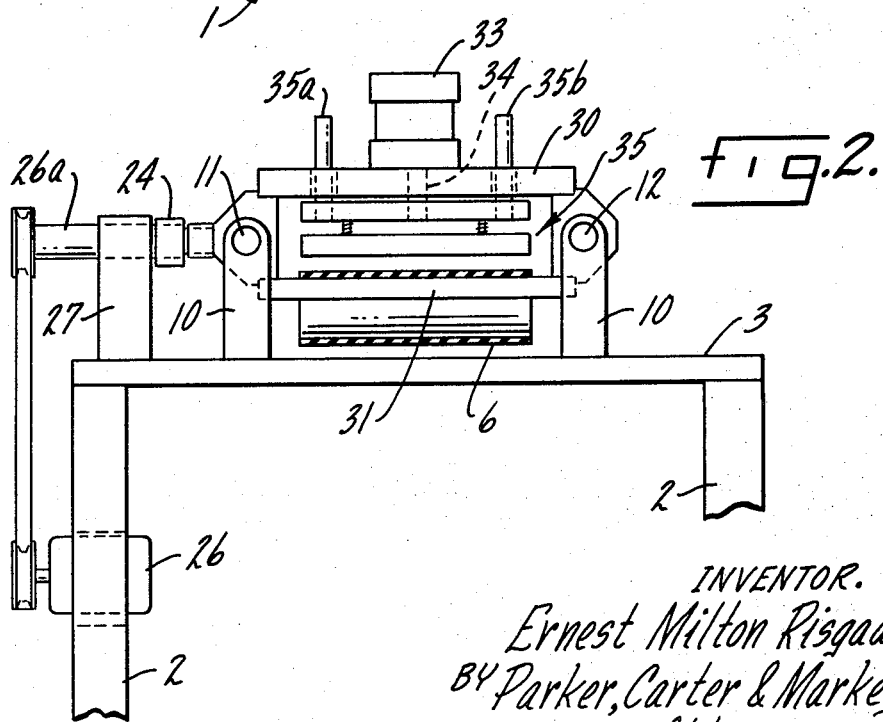
INVENTOR.
Ernest Milton Risgaard
BY Parker, Carter & Markey
Attorneys.

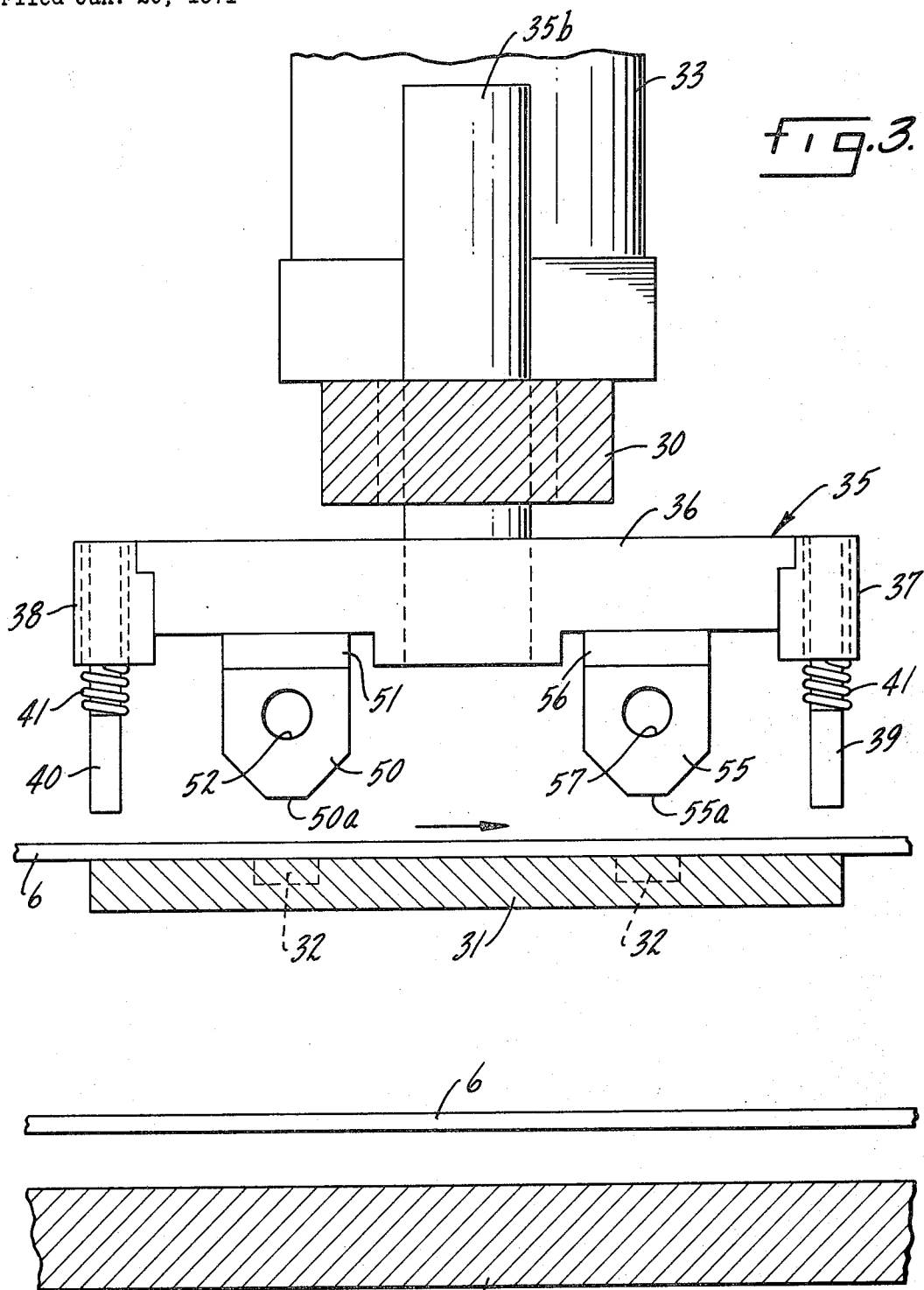

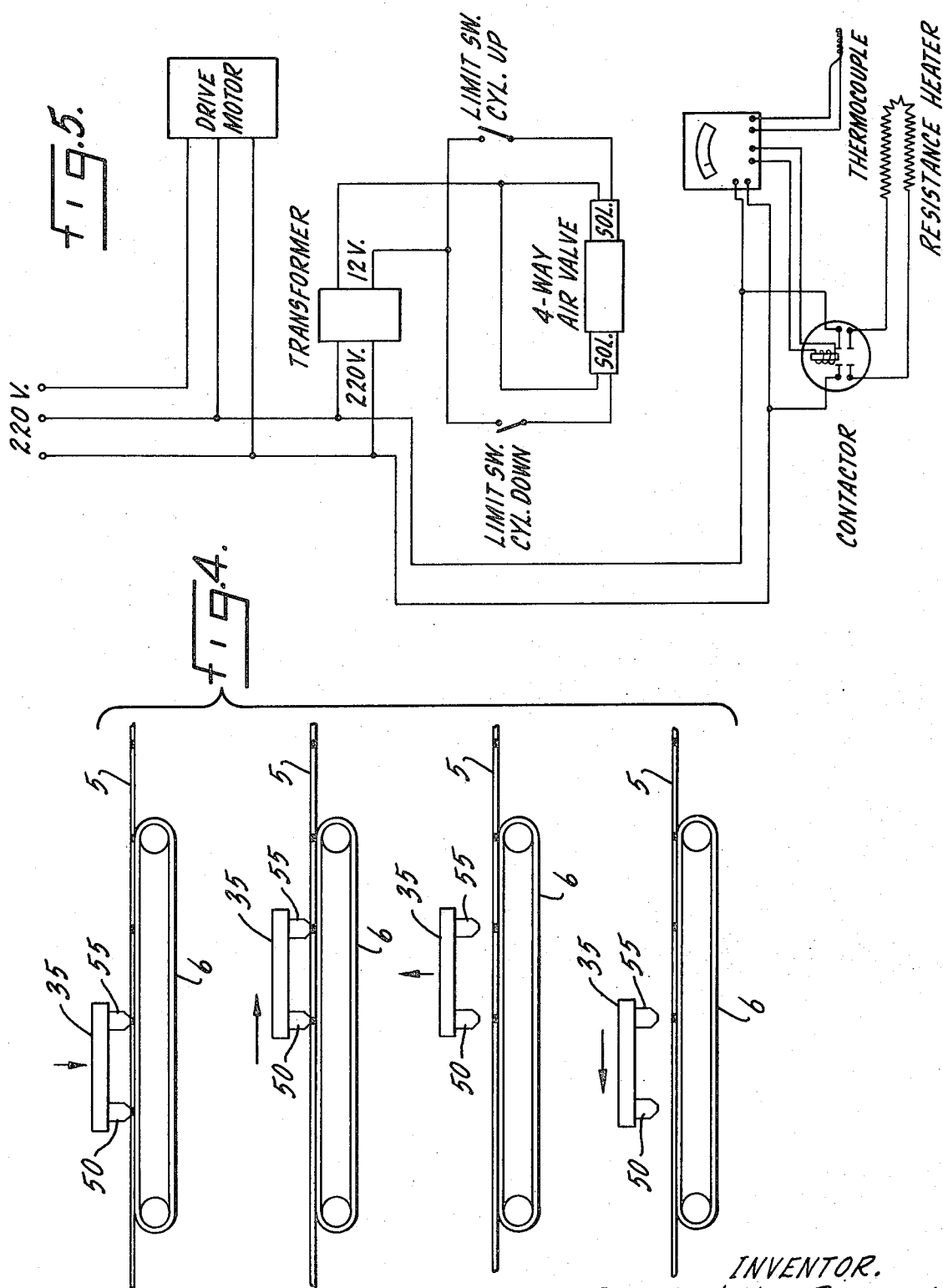

United States Patent Office 3,692,608
Patented Sept. 19, 1972

3,692,608
SEALING MEANS AND METHOD
Ernest Milton Risgaard, Baraboo, Wis., assignor to Nasco Industries, Inc., Fort Atkinson, Wis.
Filed Jan. 20, 1971, Ser. No. 108,086
Int. Cl. B32b 31/08, 31/20
U.S. Cl. 156—282
9 Claims

ABSTRACT OF THE DISCLOSURE

Spaced hot and cold bars are moved into contact with film to be sealed. The film and bars are then moved together. The film is stopped and the bars are raised and indexed rearwardly to place the cold bar in contact with the seal just made and the hot bar in contact with the film to create another seal.

SUMMARY OF THE INVENTION

This invention relates to the sealing of plastic film and particularly to a means and method of producing improved seals at higher production rates.

One purpose of the invention is to provide automatic means of heat-sealing and cooling the seal at an increased continuous rate.

Another purpose is to provide a means and method of heat sealing two layers of plastic film and cooling the seal while moving the film.

Another purpose is to provide an improved means and method of heat sealing the walls of a tubular film strip. A particular use, for example, of tubular film strip is in the formation of plastic bags. In production thereof the tube is sealed laterally thereacross at spaced longitudinal intervals thereon. The tube is then severed at the midline of the seal, forming a sealed end for each of two bags with each such severing. In the past said seal has been formed by a heated bar or wire brought into contact with the tubular film lying flat therebeneath. In one prior system the hot bar or wire is allowed to cool while in contact with the film and is then simply raised and the seal allowed to cool further in the atmosphere. In another, the heated member also remains in contact with the film after sealing and the heated member is positively cooled and thereafter raised from the film. In both instances the film is stationary during the heat-sealing step. In the first, the film may be moved after the heated member is partially cooled and raised and production, using this first prior method, is therefore slightly faster than that achieved in the second prior method, where the film remains stationary for a greater period while the heated member is positively cooled. With the first method, however, the seal is of very poor quality. In the second method the seal is of a better quality but production is impeded. In both cases, early separation of the hot bar tends to carry and distort the film. Accordingly, it is another purpose of the invention to provide a means and method of forming an improved seal at maximum production rates.

Other purposes may appear from time to time during the course of the specification and claims.

BRIEF DESCRIPTION OF THE DISCLOSURE

The invention is illustrated more or less diagrammatically in the accompanying drawings, wherein:

FIG. 1 is a side elevation;
FIG. 2 is an end view;
FIG. 3 is a side view with parts removed and on an enlarged scale;
FIG. 4 is a schematic illustration of elements of the invention in operation; and
FIG. 5 is an electrical circuit schematic.

DESCRIPTION OF THE PREFERRED EMBODIMENT

Referring now to the drawings, and particularly to FIG. 1, the numeral 1 generally designates a support which may take the form of a frame including upstanding leg members 2 supporting a base plate or table 3. Suitably carried on the frame 1, by brackets such as that shown at 4, is a roll 5 of tubular film. A continuous or endless belt 6, preferably formed of silicone rubber, is mounted for intermittent or indexed movement, its upper run being in a continuous direction across the table 3 and away from roll 5. Belt 6 is reinforced to withstand sealing temperatures approximating 350° to 450° F. It will be understood that suitable clutch means (not shown) are provided to insure against movement of the belt 6 in the opposite direction, as is well known. Spaced pairs of stanchions 10 rise from table 3 and support a pair of spaced slide bars or tracks 11, 12 on opposite sides of and paralleling the upper run of the belt 6.

A carriage 20 is mounted for sliding reciprocation on the tracks 11, 12. A drive arm 21 is pivoted to the carriage structure 20 as at 22 and to the outer end of a crank arm 24 as indicated at 25 for reciprocation of the carriage structure 20 on the tracks 11, 12. Conventional motor 26 is provided, it will be understood, for driving shaft 26a carried by upstanding stanchion 27 and secured to crank arm 24. Limit switches 20a, 20b are positioned at the opposite ends of the excursion of carriage 20.

The carriage structure 20 includes upper and lower plates 30, 31, respectively, the plate 30 being positioned above the upper run of belt 6, the plate 31 being positioned immediately beneath the upper run of belt 6 for contact with the under-surface thereof. The upper surface of plate 31 has elongated, lateral depressions formed therein and carrying silicone rubber pad means, as indicated at 32, the pad means 32 being spaced on plate 31 in the direction of movement of the upper run of belt 6.

Plate 30 carries a reciprocating means such as the air motor or air cylinder shown at 33 vertically and centrally thereabove. The operating shaft 34 of motor 33 descends below plate 30 and carries the sealing-cooling member 35. Guide pins 35a, 35b are carried by member 35 and extend through guide openings in plate 30.

Thus it will be observed that member 35 is reciprocal toward and away from plate 31, belt 6 and the film carried thereon and between the plates 30 and 31. Member 35 includes a base plate 36. Along its forward and rear edges the plate 36 carries support members 37, 38, respectively. Depending from the members 37, 38 are pinch bars 39, 40, respectively. It will be understood that additional pinch bars may be provided if desired. At least two pins rise from each of the bars 39, 40 into members 37, 38 and a spring 41 surrounds each of such pins. It will be observed that the bars 39, 40 extend laterally across and above the upper run of belt 6, the pins rising from bars 39, 40 into members 37, 38 being provided sufficient ingress to permit sliding movement thereinto, and compression of springs 41, when the bars 39, 40 are brought into contact with film on belt 6.

Depending from plate 36 and extending laterally across the upper run of belt 6 is a heat-sealing bar member 50. An insulating strip 51 is provided between the bar 50 and plate 36 throughout the length of bar 50. An appropriate axial hollow 52 is formed in bar 50. It will be understood that the inner end portion or portions of the hollow 52 may be suitably threaded for attachment of appropriate flexible conduit means effective to pass water at a predetermined high temperature through the bar 50. As shown, the area 52 receives the resistance heater shown in FIG. 5 to heat the bar 50 to a predetermined sealing temperature. A suitable covering (not shown) made of Teflon, for example, may be supplied for the contact surfaces of bar 50 and for the cooling bar described below to reduce tendencies toward sticking of the bars to the film.

Also depending from plate 36 and extending laterally across the upper run of belt 6 is a cooling bar 55 with its insulating strip 56 extending the length thereof between plate 36 and bar 55. It will be observed that bar 55 is spaced on plate 36 from bar 50 in the direction of movement of the upper run of belt 6 and the film thereon or forwardly of the bar 50, considering the motion of said belt and film. Like bar 50, the bar 55 is supplied with a suitable cooling means which may take the form of axial passage 57 which may equally be provided with inner end threads for attachment of appropriate flexible fluid conduits (not shown) supplying a suitable cooling fluid at a predetermined low temperature to bar 55.

The use and operation of the invention are as follows:

It will be understood that suitable electrical circuitry, such as that shown diagrammatically in FIG. 5 for example, is provided and effective to produce a coordinated reciprocation of carriage 20 in the direction of movement of film through the structure of the invention, a return of the carriage 20 to its original position while the belt remains stationary and reciprocation of member 35 toward and away from belt 6.

Thus with film on the upper run of belt 6 and beneath the member 35, means 33 moves member 35 toward belt 6 and the film thereon, or downwardly as the parts are shown in the drawings. Thereupon the pinch bars 39, 40 press the film against the belt 6 and plate 31, which is of sufficient extension to lie beneath the bars 39, 40. Thus the film to be sealed is held against slippage or movement on the belt 6 and the film portion to be sealed is relaxed and free of tension or strain. The predetermined excursion of member 35 and tension of springs 41 insure a proper engagement of pinch bars 39, 40 with the film. Substantially immediately after contact of the pinch bars with the film, the effective end surfaces 50a, 55a of the spaced bars 50, 55 are brought into contact with the film on belt 6.

As may be best seen in FIG. 4, the carriage 20 with its member 35 and with elements 39, 40, 50a and 55a in contact with the film are then moved or indexed with belt 6 and the film along the predetermined path of the upper run of belt 6 or to the right, as the parts are shown in FIG. 1. Thus the belt and film are moved by and with carriage 20, the pressure of bars 50, 55 against the film, belt 6 and plate 31 grasping the film and belt. It will be understood that the travel of the film and the elements in contact therewith is of predetermined duration sufficient to insure an effective heat sealing of the two layers of film by bar surface 50a. Silicone rubber pads 32 are carried by plate 31 beneath belt 6 in alignment with surfaces 50a, 55a. When the end of said travel has been achieved, limit switch 20b is contacted and means 33 raises member 35 from the film on belt 6. The drive link 21 is moved to return the carriage 20 and member 35 to its original position switch 20a is contacted to again lower member 35 and the process is repeated. During such return the belt 6 and the film thereon have their motion terminated and remain stationary. When member 35 is raised, bars 50, 55 separate from the film, bars 39, 40 holding the film in position while bars 50, 55 separate from the film.

It will be realized that the bar 55 is spaced forwardly of the bar 50 a distance equal to the amount of travel of the member 35, belt 6 and film thereon just described. Hence return of the carriage 20 to its original position will position the surface 55a of cooling bar 55 directly above the seal made just previously by the bar 50. When means 33 is activated to move the member 35 downwardly toward belt 6, it thus brings the cooling surface 55a into contact with a just-sealed and still hot portion of the film on belt 6 and brings the sealing surface 55a into contact with an untouched portion of the film layers on belt 6 to form another seal. It will be thus understood that the process is continuously repeated, the formation of one seal and the cooling of another seal being simultaneously accomplished thereafter by the heads 50, 55, respectively, during the simultaneous movement of the structure 35 and the film and the belt 6 in clamped, contacting relationship.

An improved seal is thus achieved by the contact of surface 50a with the film over a period sufficient to achieve the desired effect upon the material of the film layers being sealed. The substantially immediate cooling thereof, again over a time sufficient to achieve a complete, prompt and rapid cooling thereof further insures an improved and effective seal. The film layers are thus effectively heated and cooled to form a complete seal, bars 50, 55 are continuously maintained at the predetermined desired temperature and the film is continuously indexed through the sealing station, illustrated for example in FIGS. 1 and 2, at a satisfactorily high rate or level of production.

The embodiments of the invention in which an exclusive property or privilege is claimed are defined as follows:

1. Means for sealing layers of plastic film including a reciprocal carriage, means for receiving and supporting said layers within said carriage, a sealing head on said carriage and movable toward and away from said layers within said carriage, said sealing head having a heating bar and a cooling bar spaced thereon and positioned for simultaneous contact with said layers, and means for moving said carriage, said head, said receiving and supporting means, said bars and said layers together in one direction a distance substantially equal to the distance between said bars.

2. The structure of claim 1 characterized by and including means for continuously maintaining one of said bars at a high temperature and the other of said bars at a low temperature.

3. The structure of claim 1 characterized by and including pinch means mounted for movement with said bars and for contact with said layers in spaced relation to said bars and prior to contact of said bars with said layers.

4. The structure of claim 3 characterized by and including yielding means urging said punch means toward said layers.

5. The structure of claim 1 wherein said heating and cooling bars are carried by a base plate, insulating means are positioned between said bars in said plate and said plate is carried by a reciprocal motor means on said carriage.

6. The structure of claim 1 characterized by and including a support plate carried by said carriage and beneath said bars, the upper surface of said support plate carrying pad means of resilient material coextensive with and in alignment with said bars.

7. The structure of claim 1 wherein said means for moving said layers includes an endless belt, the upper run of which passes through said carriage.

8. The method of sealing layers of plastic film which includes the steps of providing a heating means and a cooling means spaced from said heating means, bringing said heating and cooling means substantially simultaneously into contact with said layers, moving said heating and cooling means and said layers together in a predetermined direction while maintaining said contact between said heating means, cooling means and layers, ceasing the moveemnt of said layers and withdrawing said cooling and heating means therefrom, retracting said heating and cooling means along and out of contact with said layers, again contacting said layers with said heating and cooling means to bring said cooling means into contact with the area of said layers previously in contact with said heating means, again moving said layers, heating and cooling means together in said direction and thereafter continuously repeating the process, said layers, heating and cooling means being moved together a distance equal to the distance between said heating and cooling means.

9. The method of claim 8 characterized by and including the steps of providing a support for said layers and pinch means movable with said heating and cooling means to hold said layers against said support prior to, during and after the period in which said heating and cooling means are in contact with said layers.

References Cited

UNITED STATES PATENTS

| | | | |
|---|---|---|---|
| 3,322,604 | 5/1967 | Schott | 156—583 |
| 3,367,261 | 2/1968 | Kashiwagi | 156—498 X |
| 2,681,097 | 6/1954 | Gray | 156—498 |
| 3,102,182 | 8/1963 | Oelze et al. | 156—583 X |

EDWARD G. WHITBY, Examiner

U.S. Cl. X.R.

156—290, 498, 583